United States Patent [19]

Nelson et al.

[11] 4,313,192
[45] Jan. 26, 1982

[54] OPTICAL TRANSDUCER ARRAY SYSTEM

[75] Inventors: David E. Nelson; John V. Bouyoucos, both of Rochester, N.Y.

[73] Assignee: Hydroacoustics, Inc., Rochester, N.Y.

[21] Appl. No.: 74,268

[22] Filed: Sep. 11, 1979

[51] Int. Cl.³ .............................................. H04J 3/02
[52] U.S. Cl. ...................................... 370/4; 370/108; 367/79
[58] Field of Search ............... 370/4, 108, 85; 367/79, 367/78; 340/858; 455/617, 618

[56] References Cited

U.S. PATENT DOCUMENTS

| | | | |
|---|---|---|---|
| 3,851,302 | 11/1974 | Schmitt | 370/108 |
| 3,911,226 | 10/1975 | Angelle et al. | 370/108 |
| 3,990,036 | 11/1976 | Savit | 340/15.5 TS |
| 3,996,553 | 12/1976 | Siems et al. | 340/15.5 TS |
| 4,005,273 | 1/1977 | Siems | 340/147 CN |
| 4,089,584 | 5/1978 | Polczynski | 370/4 |
| 4,117,448 | 9/1978 | Siems | 367/79 |

OTHER PUBLICATIONS

"A 500-Channel Streamer System", by Savit et al., 1977, Offshore Technology Conf.

Primary Examiner—Douglas W. Olms
Attorney, Agent, or Firm—Martin LuKacher

[57] ABSTRACT

An array of optical waveguide transducers, especially suitable for use in a multi-channel hydrophone seismic streamer, contains optical waveguides which are deformed in response to the parameter being sensed (underwater acoustic energy in the case of the seismic streamer). Two optical signals are obtained from each transducer, amplitude modulated in opposite polarity in accordance with the parameter and returned to a collection point by way of optical signal highways, such as optical fiber waveguides. The optical signals are time division multiplexed on the return highways by successively providing light pulses to each of the transducers upon activation of separate light sources associated therewith which are electrically activated by electrical signals propagated along a transmission line wherein the electrical signals are successively delayed. The optical signals on the return waveguides appear in time slots corresponding to the successive delays and may be sequentially interrogated at a rate compatible with the frequency response of the array system. At the collection point, the outputs of the return waveguides are subtracted thereby summing the optical signals from each transducer, while reducing noise introduced into the system as may be due both to variations in the amplitude of the light from the sources and mechanically due to deformation or bending of the optical waveguides other than in response to the parameter being sensed.

15 Claims, 10 Drawing Figures

FIG. 8

OPTICAL TRANSDUCER ARRAY SYSTEM

The present invention relates to optical transducer systems and particularly to a system or array of optical transducers which provide time division multiplexed output signals to a single collection point.

The invention is especially suitable for use in providing hydrophone arrays particularly in multi-channel hydrophone seismic streamers which may be towed under water to collect geophysical exploration data in the form of acoustic energy reflected through the water to the array from underground formations so as to obtain high resolution mapping of such formations.

This invention is related to the invention of application Ser. No. 74,270 filed concurrently herewith in the name of John V. Bouyoucos and David E. Nelson, which describes an optical transducer system which may provide one or more of the optical transducers used in the array system afforded by this invention. This invention is also related to an application Ser. No. 74,269 filed in the name of John V. Bouyoucos which describes an optical hydrophone which may be adapted for use in the array system provided by this invention. Both of these related applications are assigned to the same assignee as the instant application.

The term "light" as used herein is intended to encompass visible light as well as light in other parts of the spectrum which may be propagated by the optical waveguides which are used in the transducer system provided by the invention.

Optical transducers have been proposed which involve the use of optical waveguides and the deformation thereof to modulate output optical signals. Such optical transducers may use an optical fiber waveguide which is deformed by a grating in response to the parameter to be transduced; such deformation varying the coupling of the light propagated through the fiber from, for example, the core thereof to the clad, which has a lower index of refraction than the core. The principle upon which some of such deformable optical fiber transducers operate is described in Miller, U.S. Pat. No. 3,931,518 issued Jan. 16, 1976; Miller, U.S. Pat. No. 4,019,051 issued Apr. 19, 1977; Dyott, U.S. Pat. No. 4,135,780 issued Jan. 23, 1979; and in Jeunhomme and Pocholle, Directional Coupler For Multi-mode Optical Fibers, Appl. Phys. Lett., Vol. 29, No. 8, Oct. 15, 1976, and Keck, Schutz and Ziman, Attenuation of Multimode Glass Optical Waveguides, Appl. Phys. Lett. Vol. 21, No. 5, September 1972.

Optical transducers which operate by deformation of an optical waveguide such as a fiber are also described in Maher U.S. Pat. No. 4,128,299 issued Dec. 5, 1978; and references cited therein (Conwell, et al, U.S. patent application, Ser. No. 621,312, filed Oct. 10, 1975, Brandt et al U.S. Pat. No. 3,856,378; Snitzer U.S. Pat. No. 3,625,589; Sosnowski U.S. Pat. No. 3,802,760; Li et al U.S. Pat. No. 3,804,489; and McNaney U.S. Pat. No. 3,704,060). Other transducers which provide modulation upon deformation of an optical fiber or a surrounding member are described in Witt U.S. Pat. No. 3,051,003 issued Aug. 28, 1962; Duke U.S. Pat. No. 3,056,279 issued Oct. 2, 1962, and Wright U.S. Pat. No. 4,142,774 issued Mar. 6, 1979. It has also been proposed to provide a transducer array using an optical fiber which is deformed by deformers located successively along the line. Light is tapped from the line after each transducer to provide a return signal. The delays between the deformers are, due to the speed of propagation of light in the waveguide, extremely short making effective separation of the signals allocated to different transducers difficult, unless the deformers are widely spaced apart or the fiber between sensors is coiled to increase its effective length. Noise is also introduced into the output. Such noise may be photon noise, noise due to variation in amplitude of the light which is propagated along the fiber and noise due to bending or other deformation of the fiber at places other than where the fiber is intended to be deformed in response to the parameter being sensed. Also the propagation of the signal is subject to attenuation at each deformer as the signal is coupled out thereby limiting the number of deformers and transduction points where cognizable signals are available. The presence of noise effectively decreases the sensitivity and dynamic range of the transducer system in that the portion of the range where signals are produced within the noise is not usable.

The principles of the invention may find application to other types of optical transducers which are effectively deformed in order to provide modulated optical signals. A survey of such transducers which have been developed for use as optical hydrophones is described in Shajenko, Progress on Optical Hydrophones, U.S. Navy Journal of Under Water Acoustics, Vol. 29, No. 2, 169 (April 1979) (see also Bucaro et al U.S. Pat. No. 4,162,397 issued July 24, 1979).

In order to obtain high resolution response and mapping of geological formations which are under water, hydrophone arrays known as hydrophone streamers have been used. The resolution obtained in the mapping of the formations increases with the number of hydrophones, and streamers using upwards of 500 hydrophones have been proposed. Such streamers incorporate a large amount of electronic hardware and cabling for interrogating the hydrophones and returning the signals to the collection point, which usually is a seismic vessel which tows the streamer. Because of the complexity of the streamer, it is very expensive and increases the cost of geophysical exploration under water, particularly since it can be expected that streamers will be lost from time to time. Such streamers are described in an article by Savit and Siems, "A 500-Channel Streamer System," which was presented at the Offshore Technology Conference in Houston, Tex., May 2–5, 1977, which article also makes reference to patents which describe the electronic time multiplexing equipment of such a streamer system, namely Siems et at, U.S. Pat. Nos. 3,996,553, Savit 3,990,036 and Siems 4,005,273.

It is a feature of this invention to provide a system with optical hydrophones which can provide sufficient channels for high resolution and yet is much lower in cost than hydrophone streamers of the above discussed type.

Accordingly, it is an object of the present invention to provide an improved multiple transducer array using optical transducers.

It is a further object of the present invention to provide an improved optical multi-channel transducer system.

It is a still further object of the present invention to provide an improved sensor array especially adapted for geophysical exploration which may be used as a seismic streamer.

It is a still further object of the present invention to provide an improved optical transducer array system which is operable on a time division multiplex basis.

It is a still further object of the present invention to provide an improved fiber optic transducer array system in which the effects of noise are minimized and dynamic range is enhanced.

It is a still further object of the present invention to provide an improved optical transducer array system adapted for use as a seismic array whose signals are produced on a time division multiplexed basis within time slots which are reasonable in duration even where the transducers are spaced close to each other.

It is a still further object of the present invention to provide an improved optical hydrophone streamer adapted to have large numbers of hydrophone channels which is lower in cost in both manufacture and use than multiple channel hydrophone streamers as have heretofore been put into use.

Briefly described, a transducer system embodying the invention has an array of optical transducers. Each of these transducers has an optical waveguide with at least two output ports, such as may be provided by portions of different index of refraction and which propagate light applied to an input end of the transducer. This waveguide is preferably an optical fiber with the core and clad which surrounds the core of different indexes of refraction. The parameter to be sensed or transduced, such as the acoustic signal in an underwater environment where the system is used in a hydrophone streamer, is applied to deform the guide and modulate the amplitude of the light which is propagated through the guide to produce output optical signals of opposite polarity at the output ports. (e.g., from the fiber core and clad) which increase and decrease in magnitude with increasing deformation of the fiber. Separate electro-optical light sources, such as light emitting diodes are provided for applying light to the input ends of each of the guides. An optical signal return highway is provided by a pair of optical waveguides, such as other optical fibers. The output ports of the transducer waveguides are coupled to different ones of these return highway waveguides, such that optical signals from each of the transducers may be transmitted along these guides to a collecting point. Each transducer is selectively activated by successively enabling the light source associated therewith. If desired, several transducers are operated in parallel, one light source may be provided for the parallel actuated transducers in the group or the light sources for each transducer activated simultaneously. The successive activation of the light sources may be accomplished by means of an electrical signal transmission line having successive sections each of which provides a delay. The sections are coupled to the light sources and successively enable the sources. Accordingly, the parameter which is sensed appears in time division multiplexed relationship in successive time slots equal to the delay time of each section. At the collecting point the optical signals may be converted into electrical signals and outputs corresponding to the differences therebetween obtained by analog or digital circuitry. The digital circuitry may be synchronized with the times of enablement of the light sources at the transducers. The optical signals from the transducers may be balanced on a DC or average basis by biasing the transducers and/or the DC or average values of the electrical signals at the collecting point may be balanced or normalized. The differential output enables the minimization of the noise components of the signal and effectively increases the sensitivity and dynamic range of the system.

The foregoing and other objects, features and advantages of the invention as well as presently preferred embodiments thereof will become more apparent from a reading of the following description with the accompanying drawings in which.

Figure 1:
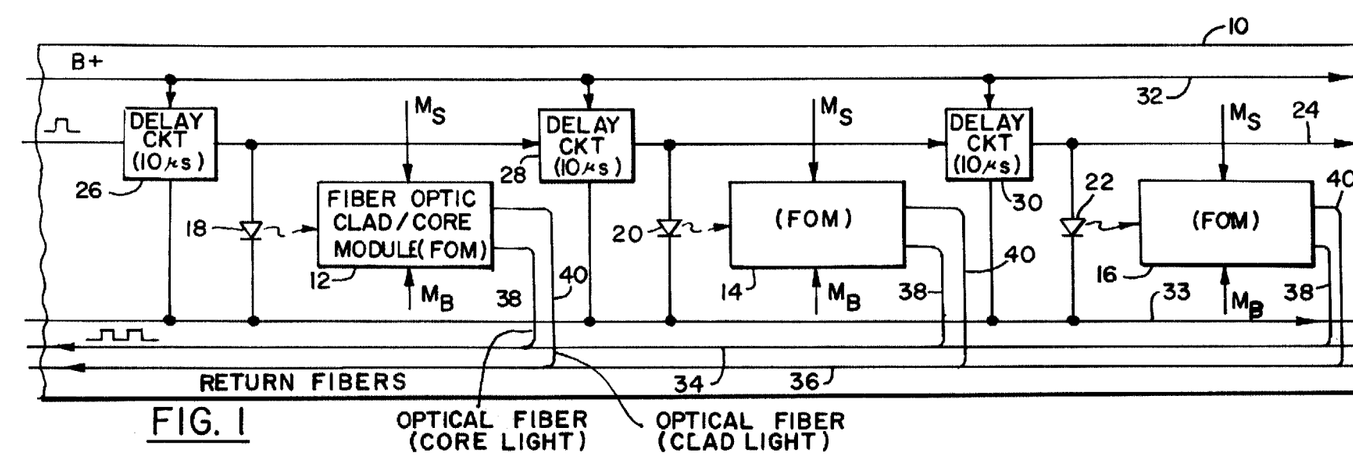
FIG. 1 is a block diagram of an optical transducer array system, especially adapted for use in a hydrophone seismic streamer, which system embodies the invention.

Referring first to FIG. 1, there is schematically shown a portion of a cable 10, in which is contained optical hydrophones which contain optical waveguides. In this illustrative example of a presently preferred embodiment of the invention the optical waveguides are optical fibers. These fibers are contained in fiber optic clad/core modulators, three of which 12, 14 and 16 are shown as being representative. The fiber optic clad/core modulators (some of which are identified in the drawing by the acronym FOM) may be disposed in the cable 10 so that the sea water carrying the seismic or other acoustic signal to be transduced may be incident on the FOM's 12, 14 and 16. The cable 10, the FOM's 12, 14, and 16 and the components associated with the FOM's provide an optical hydrophone streamer. Several hundreds of optical hydrophones in the form of FOM's may be disposed successively along the cable 10. The number of FOM's and their spacing is determined by the resolution desired of the target or of the earth formation which is to be detected or surveyed. For example, the FOM's may be 1 to 3 meters apart along the cable 10.

Each of the FOM's has a separate light source, shown as light emitting diodes 18, 20 and 22, associated therewith. It may be desirable to sum the signals from a group of optical hydrophones into a single channel. The hydrophones themselves may be separate FOM's which are spaced apart successively along the cable 10. Either a single light source or separate light sources which are illuminated simultaneously are then used. The signals from the group FOM's will then appear together.

The streamer with the cable 10 is adapted to be towed through the water, as by a seismic exploration vessel.

This vessel also serves as the collection point for the signals (viz., the acoustic or seismic pressure) from each observation point. These observation points are the locations of the FOM's. In order to activate the light sources, a transmission line 24 for electrical pulses is provided which extends along the cable from the collecting point. A pulse generator provides the pulses at a rate at which the acoustic or seismic signals are to be sampled by the FOM's at each observation point along the cable. A suitable rate may be 1 KHz. It is a feature of this invention to enable the optical hydrophone to be sampled at a 1 KHz rate or any other rate which is compatible with the number of optical hydrophones in the streamer, while at the same time enabling the hydrophones to be located at observation points suitably spaced along the streamer to obtain the accuracy or target resolution which is desired. To this end, each section of the transmission line 24 between adjacent optical hydrophones provides a separate pulse delay. Exemplary delay circuits 26, 28 and 30 are shown in the sections of the line 24 ahead of the light emitting diodes 18, 20 and 22 which are connected to the outputs of these delay circuits 26, 18 and 30 respectively. The circuits may be delay lines and may have amplifiers associated therewith. Preferably one-shot multivibrators are used which are powered by voltage applied to a power line 32. This voltage is indicated as B+ and may be generated at the collecting point. A power supply on the survey vessel may be provided for this purpose. An electrical return line 33 which is connected to a reference potential, such as ground, completes the circuits through the LED's 18, 20 and 22 and delay circuits 26, 28 and 30.

When one-shots are used as the delay circuits they also provide amplification and pulse shaping of the pulses transmitted along the transmission line 24. Consider for example that each delay circuit interposes a 10 microsecond (us) delay to the pulses which are provided at a 1 KHz rate, then the pulses are applied at the 1 KHz rate to each of the LED's but 10 us apart at each successive LED. The sampling of each LED is multiplexed in time slots 1000 us apart. An observation point (viz., a different FOM) is interrogated every 10 us. The maximum sampling rate for a 100 channel streamer is then 100 KHz. For 500 channels the total rate, considering a 1 KHz individual rate for each of the optical hydrophones, would be 500 KHz, with 2 us delay. Accordingly, the hydrophone streamer system with a 1 KHz individual sampling rate (viz., pulses generated at the head end of the line 24 at 1 KHz) can easily have 500 hydrophone channels and can accommodate over 1000 channels.

Sampling theory states that signals sampled at a 1 KHz rate must contain no frequency components above 500 Hz, or a deleterious effect called aliasing will occur. Consequently, the exemplary sampling frequency of 1 KHz used here could theoretically be used for signals with frequency components as high as 500 Hz. However, the use of an anti-aliasing filter is desirable. Such a filter may have a moderate cut-off slope over, for example, a frequency interval of 2:1. The system then can be effective in sensing signals with frequency components as high as 250 Hz.

In order to return the signals transduced by the optical hydrophones to the collecting point, a pair of optical waveguides in the form of optical fibers 34 and 36 are provided as return highways. A pair of waveguides in the form of optical fibers are connected from each FOM separately to the return fibers 34 and 36. Each of the FOM's has a pair of output ports connected to output fibers 38 and 40 which carry light, for example, from the core and the clad of an optical fiber waveguide in the modulators. These output fibers 38 and 40 are coupled to the return fibers 34 and 36. It is on these return fibers 34 and 36 that optical output signals corresponding to the parameter being sampled is communicated in time division multiplexed relationship (TDM) back to the collection point.

In the case of a seismic streamer, the parameter is acoustic (seismic) signals at each observation point at which the FOM's 12, 14 and 16 are located. The optical output signals are in the form of optical pulses. Since each FOM is interrogated by an optical pulse generated by its associated LED 18, 20 and 22, when the LED is activated by an electrical pulse transmitted along the transmission line 24, these optical pulses occur in successive time slots. The time slots are 10 us in duration in the case where each delay circuits 26, 28 and 30 interposes a 10 us delay. Accordingly, the optical signals on the return fibers are time division multiplexed on the return fibers. The use of a single transmission line to interrogate all of the optical hydrophones and only a pair of return highways for carrying time division multiplexed optical signals enables the cost of the optical hydrophone streamer to be much less than multi-channel streamers which have been used heretofore, such as the streamer system described in the above-referenced article by Savit and Siems. Where the FOM's are grouped, the signals from the group are transmitted over the return fibers in the same time slot.

The FOM may be of the type which deforms an optical waveguide to provide a pair of optical outputs. FOM 12 is typical and is exemplified in FIG. 2 as having an optical waveguide in the form of an optical fiber 42 having a core 44 and a clad 46. The index of refraction of the clad 46 is lower than the index of refraction of the core. It is to the input end of this optical fiber waveguide 42 that optical pulses are applied from its associated LED 18, when that LED 18 is pulsed by electrical pulses transmitted along the line 24 and which appear at the output of the delay circuit 26 to which the LED 18 is connected. The fiber 42 is deformed in response to the signal being transduced which is indicated as $M_S$. This signal may be an acoustic or seismic signal which varies the spacing 48 between plates 50 and 52 having gratings on the opposing surface thereof. This grating is represented by teeth 54 and 56 on the inside surface of the plate 50 and a tooth 58 on the inside surface of the plate 52. As the acoustic signal pressure varies, the optical fiber 42 is deformed by being deflected between the teeth of the grating plates 50 and 52. This deformation as explained in the above-referenced patents and articles, particularly the article by Jeunhomme and Pocholle, varies the amplitude and of course the power of the light coupled to the clad 46 from the core 44 of the fiber 42. A portion of the light continues to be propagated through the core 44 of the fiber 42 and a portion is coupled to the clad 46. The clad light is tapped by another optical fiber. The optical fiber which carries the core light is an output port of the fiber waveguide and is used as an output fiber 38 while the optical fiber which carries the clad light is another output port of the fiber waveguide and is used as the fiber 40. These are the fibers which are connected to the return fibers 34 and 36 as shown in FIG. 1.

Figure 2:
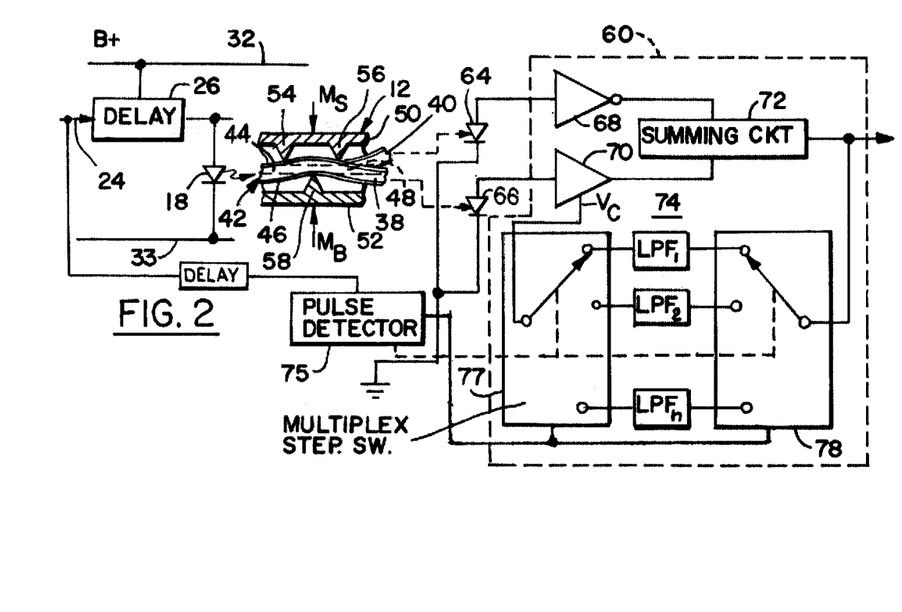
FIG. 2 is a simplified schematic diagram showing one of the optical transducers, the light source and activation circuit therefor, as well as circuitry for obtaining electrical outputs from the return fibers of the system.
Figure 3:
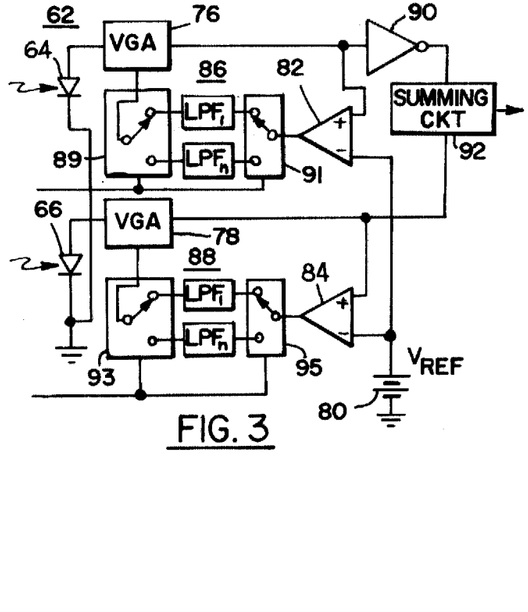
FIG. 3 is a block diagram illustrating another circuit for deriving electrical outputs from the transducer system shown in FIG. 1.

It is preferable to apply a bias $M_B$ to the deformer plates so that the average value of the amplitude, and of course the power, of the light coupled to the output fibers 38 and 40 are balanced on a steady state or average basis. Alternatively, or in addition, balancing of the DC or average value of these optical outputs may be provided by electrical circuitry. This electrical circuitry is shown in FIG. 2 as the circuit 60. Alternatively, the circuit 62 as shown in FIG. 3 may be used. The circuits shown in FIG. 2 and FIG. 3 are analog circuits. If digital processing of the data obtained from the optical hydrophones is desired the circuitry shown in FIG. 10 may alternatively be used. In the case of any of this circuitry 60, 62, or the circuit of FIG. 10, outputs corresponding to the difference in the amplitude of the light coupled to the clad and in the core of the optical fibers in the FOM's 12, 14 and 16 are derived in order to minimize the noise introduced both by the light sources and in the output fibers 38 and 40 and return fibers 34 and 36. Such a transducer system, in which the effects of noise are minimized is described particularly and is the subject matter of the above mentioned application Ser. No. 74,270 which is filed concurrently herewith in the name of John V. Bouyoucos and David E. Nelson. It is preferable that the mechanical noises introduced into the pair of return fibers 34 and 36 be identical. This may be achieved by routing the fibers 34 and 36 together, such that any mechanical deformations which would tend to alter the transmission loss, or in other words modulate the transmitted light intensity (inserting noise), affects each fiber identically.

In FIG. 2 the circuitry 60, which like the other circuits may be located at the collecting point, makes use of photodetectors 64 and 66 which receive outputs from the return fibers 34 and 36. These outputs are shown coming from the output fibers 38 and 40 of FOM 12 in FIG. 2. It will be appreciated however that these signals are first communicated via the return fibers 34 and 36 before reaching the photodetectors 64 and 66. One of the photodetectors 64 is connected to an inverting amplifier 68, while the other photodetector 66 is connected to a variable gain amplifier 70. The outputs of these amplifiers are applied to a summing circuit 72, which, due to an inversion in the amplifier 68, provides an electrical output in the form of a pulse corresponding to the difference in amplitude of the optical pulses which are incident upon the photodetector 64 and 66. The output is fed back through a bank of low pass filters 74 ($LPF_1$, $LPF_2$ ... $LPF_n$) via multiplex stepping switches 77 and 78. Each filter in the bank is switched in during a successive time slot. Switching is controlled by a pulse detector 75 which responds to the pulses from one of the highway fibers, shown in FIG. 2 as from the photodetector 66 for example or by other means, such as a delay circuit actuated delay circuit 26, so that the switching is in synchronism with the transmission of light pulses through the FOM 12 and the detection thereof by the diodes 64 and 66. The filters 74 each have a cutoff frequency below the minimum frequency of interest. In the case of acoustic signals the cutoff frequency of the filters 74 may be a few Hertz, e.g., 5 Hz. The filters provides a control voltage $V_c$ to control the gain of the variable gain amplifier 70. Since only DC and low frequency components are fed back by the filters 74, the gain of the difference circuit on a DC or average value basis becomes balanced because the gain of the amplifier 70 increases or decreases until the DC or average value of the output from the summing circuit for each individual transducer is reduced.

In FIG. 3 the photodetectors 64 and 66 are output connected to variable gain amplifiers 76 and 78. The gain of each of these amplifiers is normalized on a DC or average basis such that the average or DC value of the amplifier outputs equals in amplitude the amplitude of a reference potential $V_{REF}$ which is shown being derived from a battery 80, by way of example. The normalization is accomplished by gain control feedback circuits having difference amplifiers 82 and 84 to which the reference potential and the outputs from the variable gain amplifiers 76 and 78 are applied. The error signals from the differential amplifiers 82 and 84 are passed through banks of lowpass filters 86 and 88 each of which have their cutoff frequencies below the lowest frequency of interest. The filters in the banks 86 and 88 are switched so that a different filter is connected in each successive time slot by multiplex switches 89, 91, 93 and 95 as was explained for the bank of filters 74 in FIG. 2. The error signals from the lowpass filters thus control the gain of the variable gain amplifiers 76 and 78 so that the DC or average value matches and normalizes the gain to the reference potential $V_{REF}$. The outputs of the variable gain amplifiers are thus balanced on a DC or average value basis.

These outputs are applied to a difference circuit which is shown schematically as being an inverting amplifier 90 and a summing circuit 92. The summing circuit produces the output corresponding to the difference between the optical signal pulses applied to the photodetectors 64 and 66 from the return fibers 34 and 36 (FIG. 1). The electrical outputs from the circuits 60 and 62 as shown in FIGS. 2 and 3 may be multiplexed into different channels corresponding to each of the hydrophone channels by a multiplexer which is operated at a 100 KHz rate in response detected light pulses and provides outputs separated by 10 us corresponding to the time slots in which the pulses from the successive transducers (viz., FOM's 12, 14, 16 in FIG. 1) occur. The output of the multiplexer may be recorded for later processing which, in the case of seismic signals obtained from a streamer system such as shown in FIG. 1, will produce seismograms.

Figure 10:
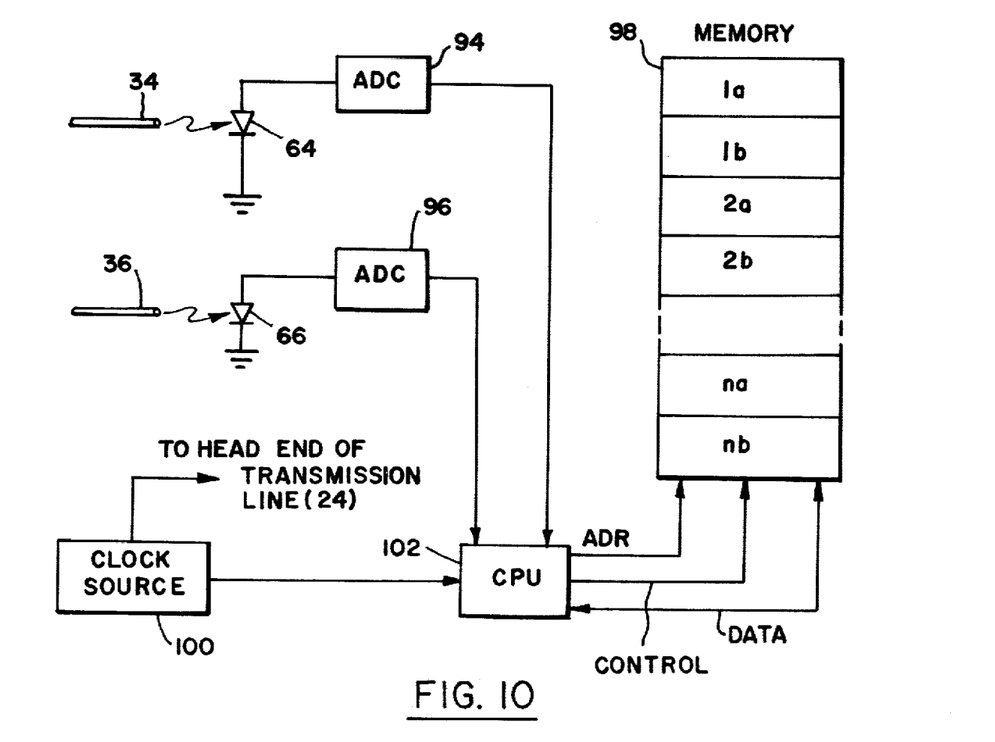
FIG. 10 is a circuit for digitally processing the optical signals provided by the return fibers shown in FIG. 1.

The digital system shown in FIG. 10 also uses photodetectors 64 and 66 which respond to the optical pulses from the return fibers 34 and 36. Analog to digital converters (ADC 94 and 96) convert these pulses into digital signals and present them for storage in separate adjacent locations in a memory 98. This memory may be a random access memory (RAM) having locations 1a, 2a, ... na, for the digital signals (bytes) converted by the ADC 94). The memory 98 also is shown as having separate locations 1b, 2b, ... nb, for the digital signals converted by the ADC 96. A generator which produces the pulses which are applied to the head end of the transmission line 24 is shown as a clock pulse source 100. Pulses synchronous with these clock pulses are also applied to a processing unit indicated as a CPU 102. The CPU may be a microprocessor, for example. The CPU is programmed so as to generate address signals which address the memory 98 to the digital signals from the ADC's 94 and 96 via the CPU 102 in the designated locations in the memory 98. These addresses are applied to the memory by way of an address (ADR) line. Control signals are also applied by way of a control line from the CPU 102 to the memory 98. To condition the memory to write or store the signals from the ADC's 94 and 96 or to read out the stored signals on a data line, the data is processed in the CPU 102 under program control so as to enable balancing of the DC or average value of the signals while deriving outputs corresponding to the difference between these signals on a dynamic basis, thus minimizing the noise in the system. As explained in the above-identified related application, the minimization of the noise by balancing the signals which are derived from the core and the clad of the fiber optic waveguides in the FOM's, the dynamic range of the FOM's is effectively increased. The CPU 102 provides output data which represents the parameters being sensed (viz., the acoustic or seismic signals) at each observation point. These are, in the case of the system shown in FIG. 1, the signals from the various optical hydrophones provided by the FOM's 12, 14 and 16. The output data may be coded to designate the observation point or hydrophone channel from which it is derived. This data may then be applied to other processing systems for the production of seismograms or other displays of the parameters sensed by the optical transducers.

Figure 4:
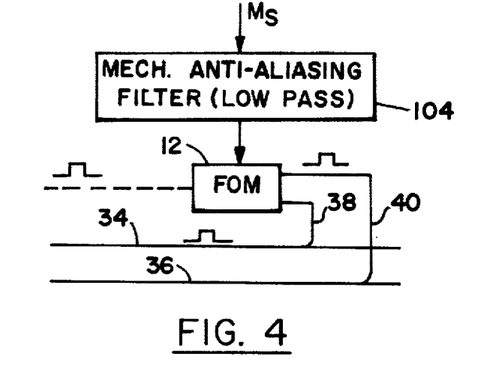
FIG. 4 is a block diagram illustrating an optical transducer suitable for use in the system shown in FIG. 1 having mechanical anti-aliasing means associated with the fiber modulator.

The systems herein described are sampling systems where the parameter being sensed, such as acoustic pressure variations in the case of the optical hydrophones shown in FIG. 10, are sampled at a sampling rate which is the rate at which the light pulses are individually generated at each of the LED's 18, 20 and 22. As noted above, this sampling rate may, for example, be 1.0 KHz. Sampling theory states that for the parameter to be specified by the samples, the parameter must be a function which contains no frequencies higher than half the sampling rate. A sampling rate at twice the highest frequency of interest in the function being sampled is sometimes called the Nyquist rate. The distortion which results when the parameter being sampled has frequencies above half of the Nyquist rate is called aliasing. As shown in FIG. 4 in a general way, a mechanical lowpass anti-aliasing filter 104 is provided in the path of the mechanical signal $M_S$ before it is applied to the optical hydrophone. This optical hydrophone is shown by way of example as the FOM 12 which was described in connection with FIGS. 1 and 2.

Referring to FIGS. 5 through 8, there is shown a typical one of the FOM's 12 which is provided with mechanical anti-aliasing filters 104 and 104'. The FOM includes the optical fiber waveguide 42. The light emitting diode 18 applies light pulses to the input end of the waveguide. The waveguide passes through diametral slots 106 and 108 in grating plates 110 and 112. The gratings 114 and 116 in these plates 110 and 112 are separated from the rims 118 and 120 by annular grooves 122 and 124. These grooves define thin walled flexural annular sections 126 and 128. The rims 118 and 120 of the plates 110 and 112 are slightly thicker than the thickness of the plates between the apexes of the teeth of the gratings and the outside surfaces of the plates. Accordingly, a predetermined mechanical bias is applied to the fiber 42 which is thereby deflected and deformed by a predetermined amount so that on a DC or average basis the light retained, for example, in the core of the fiber 42 which appears at the output fiber 38 is equal in amplitude to the light coupled, for example, to the clad which appears at the output of the fiber 40 which taps the clad light. In the event that compensation for pressure variation due to the depth under the water at which the FOM 12 is deployed is desired, an annular flexible diaphragm may be disposed within the grooves 122 and 124 to provide separate chambers which are in communication respectively with the ambient sea water environment and with the volume between the gratings 114 and 116. The latter volume is made much less than the volume of the grooves 122 and 124. As the pressure of the ambient water increases, gas in the volume between the gratings correspondingly increases in pressure so as to compensate for increasing pressure of the water. The hydrophone arrangement having pressure compensation as just described is the subject matter of the above-identified related application, Ser. No. 74,269 which is filed concurrently herewith in the name of John V. Bouyoucos.

Figure 5:
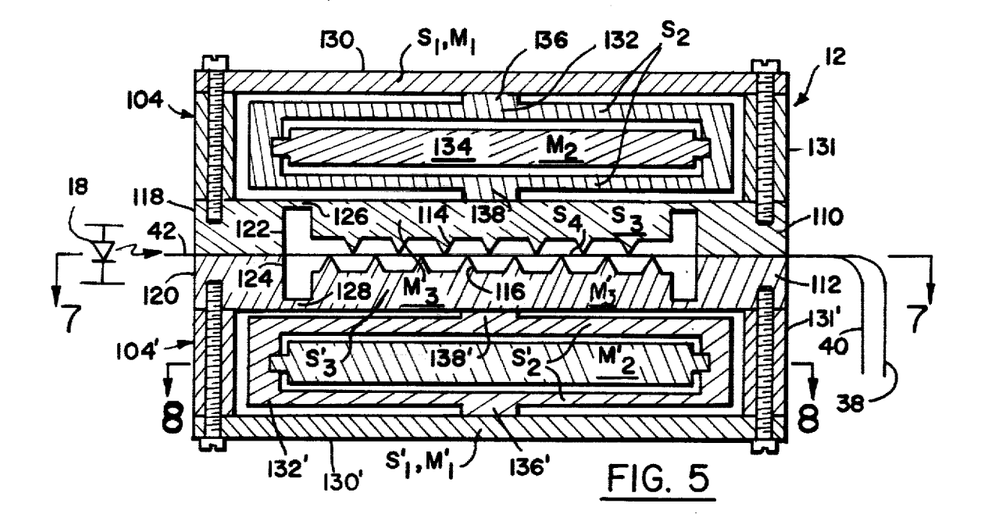
FIG. 5 is a sectional view of a fiber optic transducer which provides the modulator with an anti-aliasing filter as illustrated in FIG. 4.
Figure 6:
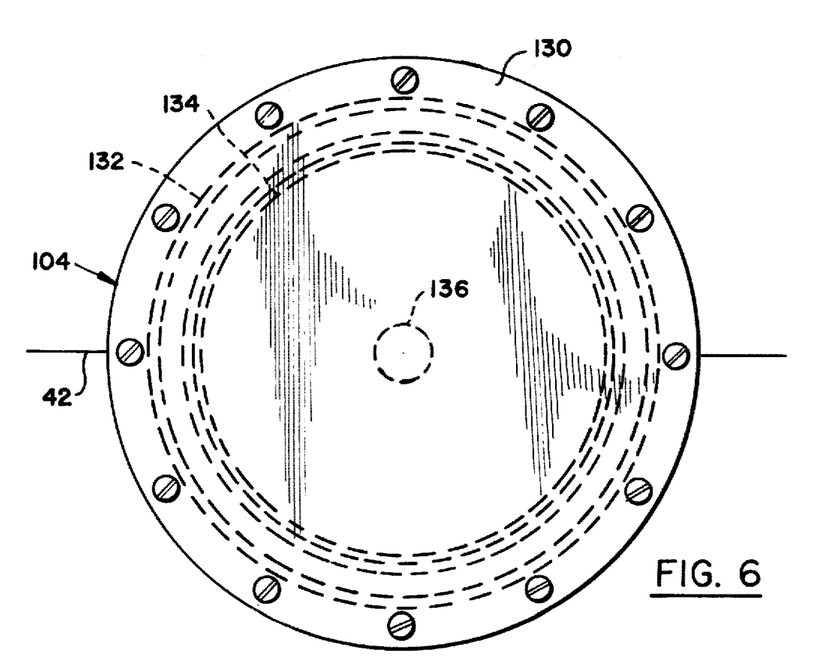
FIG. 6 is a top view of the transducer shown in FIG. 5.
Figure 7:
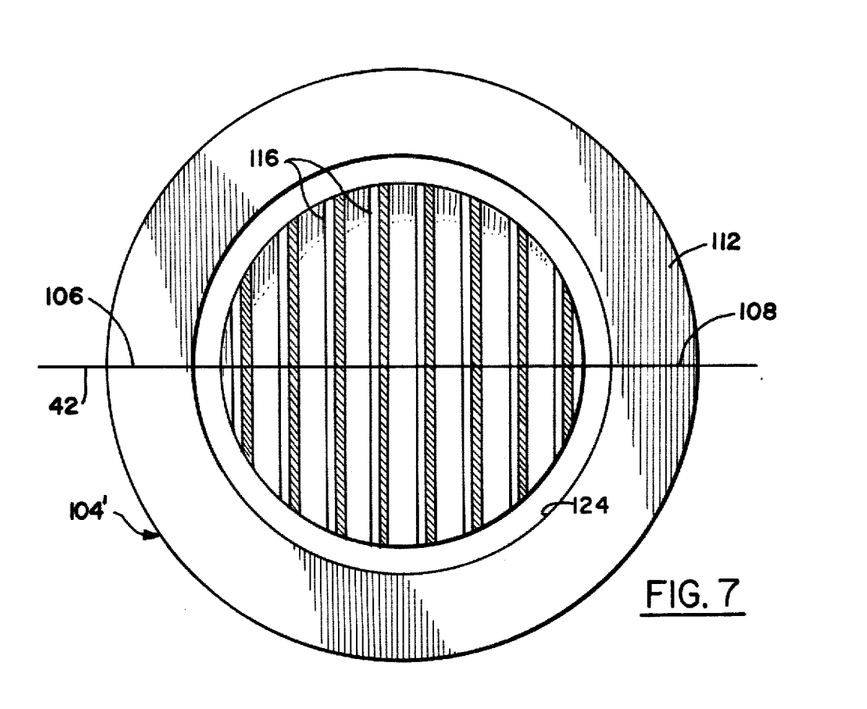
FIGS. 7 and 8 are sectional views along the lines 7—7 and 8—8 of FIG. 5.
Figure 8:
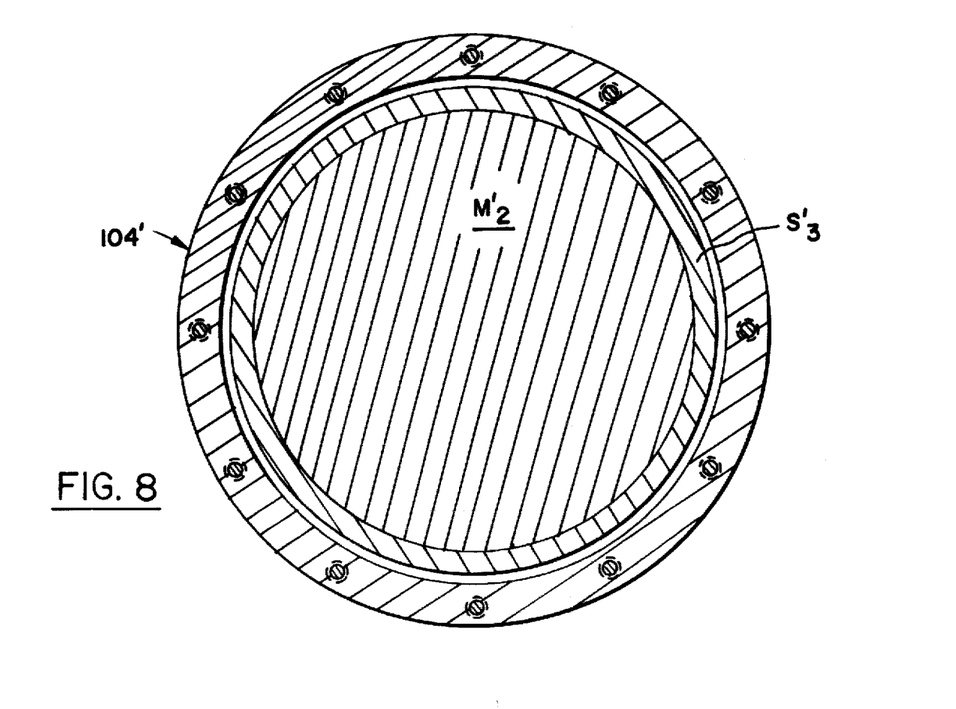
Figure 9:
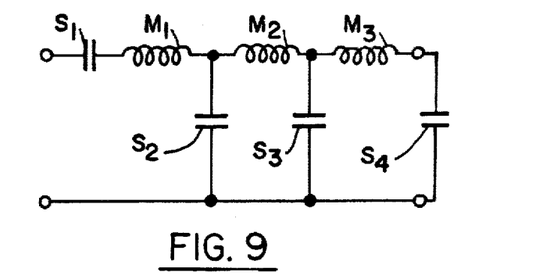
FIG. 9 is a schematic diagram of the electrical analog of the mechanical circuit of the transducer shown in FIGS. 5 to 8 to illustrate that it is a lowpass filter.

Considering the anti-aliasing filter 104, that filter is made up of a diaphragm 130 spaced from the outside surface of the grating plate 118 by a cylindrical ring 131. The diaphragm is a flexural member which is subject to displacement in response to pressure variations as caused by acoustic energy such as seismic waves. The diaphragm 130 has a stiffness $S_1$ and a mass $M_1$. Coupling the diaphragm 130 to the grating plate 118 are two members 132 and 134. The member 134 may be a metal disc having a mass $M_2$, which disc is rigid. The disc is contained within a hollow cylinder provided with tabs 136 and 138 at opposite ends thereof. This hollow cylinder is the member 132 which couples the diaphragm 130 to the grating plate 118. The tabs 136 and 138 are disposed with their axes along the axis of the grating plate 118 and diaphragm 130. The member 132 may be made of plastic such that it is very flexible but has relatively little mass. The stiffness of the member 132 is indicated as $S_2$ while the mass of the member 134 is indicated as $M_2$. The grating plate has a mass and stiffness components indicated as $M_3$ and $S_3$. The optical fiber 42 presents a stiffness to the system indicated as $S_4$. The acoustic equivalent circuit of the mechanical anti-aliasing filter 104 is shown in FIG. 9. It is apparent from FIG. 9 that the filter is a low-pass filter. The various components may be sized so that the cutoff frequency of the filter 104 is well below 500 Hz where the interrogation or sampling rate is 1.0 KHz. Aliasing distortion is then eliminated. Another anti-aliasing filter 104' is provided on the outside of the grating plate 120 and cooperates with that grating plate. The design of the anti-aliasing filter 104' is the same as the design of the above-described anti-aliasing filter 104, and corresponding parts are mixed with corresponding reference numerals but with primes (') at the end thereof.

From the foregoing description it will be apparent that there has been provided an improved transducer array system which is especially adapted for use in and as part of an optical hydrophone seismic streamer. Variations and modifications in the hereindescribed system will undoubtedly suggest themselves to those skilled in the art. Accordingly, the foregoing description should be taken merely as illustrative and not in a limiting sense.

We claim:

1. A transducer system which comprises an array of optical transducers each having an optical waveguide with at least two output ports for propagating light applied to said waveguide, means responsive to the parameter to be transduced for deforming said guide to modulate the amplitude of said light propagated through the waveguide to produce output optical signals at the output ports which respectively increase and decrease in amplitude with increasing deformation, separate electro-optical light sources for applying light to each of said waveguides, a pair of optical waveguides providing an optical signal highway, said pair of highway waveguides being coupled to the output ports of each of said transducer waveguides, and means for successively enabling each of said sources to apply successive pulses of light to each of said transducer waveguides whereby optical signals from each of said transducers appear in time division multiplexed relationship on said highway waveguides.

2. The invention as set forth in claim 1 wherein said enabling means comprises a plurality of delay circuit means connected in succession for transmitting said electrical pulses, each of said delay circuit means having outputs connected separately to each of said light sources.

3. The invention as set forth in claim 1 wherein said light sources are light emitting diodes.

4. The invention as set forth in claim 1 further comprising means connected to said highway waveguides for providing electrical outputs corresponding to the difference in amplitude of the optical signals from the output ports of said guides.

5. The invention as set forth in claim 4 further comprising means for adjusting the average amplitude of at least one of said optical signals and electrical signals corresponding thereto such that said electrical outputs are minimized in the absence of the parameter being transduced.

6. The invention as set forth in claim 5 further comprising separate photodetectors for converting the optical signals propagated along said highway waveguides into a pair of said electrical signals, and a feedback circuit responsive to said electrical outputs for varying the average amplitude of one of said pair of electrical signals to provide balancing of the average amplitudes thereof.

7. The invention as set forth in claim 5 further comprising separate photodetectors for converting the optical signals propagated along said highway waveguides into electrical signals, means for normalizing the average amplitude of each of said electrical signals, and means for providing said electrical outputs in response to the difference between said normalized electrical signals.

8. The invention as set forth in claim 5 wherein said balancing means comprises means for applying predetermined deformations to said transducer waveguides such that said optical signals from said two ports have equal amplitudes in the absence of the parameter being transduced.

9. The invention as set forth in claim 1 further comprising anti-aliasing means for applying the parameter to be transduced to said deforming means.

10. The invention as set forth in claim 9 wherein said anti-aliasing means is a mechanical lowpass filter having a cutoff frequency no greater than one-half the rate at which said light sources are individually activated.

11. The invention as set forth in claim 1 wherein said transducer waveguides each comprises a first length of optical fiber with a core and a clad which provide said two optical signal output ports, said light sources being disposed to apply said light pulses to an end of said fiber on one side of said deforming means, a second length of optical fiber coupled to said clad on the opposite side of said deforming means, and said first and second fibers being coupled to different ones of said highway waveguides, said highway waveguides being separate optical fibers.

12. The invention as set forth in claim 11 wherein said deforming means comprises a pair of members between which said fiber is disposed, at least one of said members having a grating for applying pressure to said fiber in response to the parameter to be transduced.

13. The invention as set forth in claim 12 wherein said member having said grating further comprises means flexurally mounting said grating, a diaphragm also mounted on said member having said grating, and means providing a mechanical anti-aliasing filter coupling said diaphragm to said grating.

14. The invention as set forth in claim 1 further comprising a streamer cable adapted to be transported through a body of water, said deforming means each including means responsive to acoustic energy in the water as said parameter for deforming said transducer waveguides, and said transducer waveguides being disposed successively along the length of said streamer cable, and said light sources, enabling means and highway waveguides being contained in said cable.

15. The invention as set forth in claim 1 further comprising means for providing a first and a second train of electrical pulses which are synchronous, the second being delayed with respect to the first, said enabling means being responsive to said first train of pulses, first and second photodetector means separately responsive to the optical signals from said pair of highway waveguides for converting said optical signals into corresponding electrical signals, analog to digital converter means enabled by second train of pulses responsive to said electrical signals for converting said electrical signals into digital signals representing the amplitudes thereof, memory means having storage for said digital signals, processing means responsive to said second train of pulses for controlling said memory means to store said digital signals occurring in different times corresponding to the times of occurrence of optical signals from different ones of said transducers in predetermined locations therein, said processing means including means for deriving outputs corresponding to the parameter being transduced from said stored digital signals.

* * * * *